US012800848B2

(12) United States Patent
Hinata

(10) Patent No.: US 12,800,848 B2
(45) Date of Patent: Nov. 17, 2026

(54) OPTICAL CONNECTOR AND OPTICAL CONNECTOR MODULE

(71) Applicant: Enplas Corporation, Saitama (JP)

(72) Inventor: Ayano Hinata, Saitama (JP)

(73) Assignee: Enplas Corporation, Saitama (JP)

( * ) Notice: Subject to any disclaimer, the term of this patent is extended or adjusted under 35 U.S.C. 154(b) by 274 days.

(21) Appl. No.: 18/713,608

(22) PCT Filed: Nov. 29, 2022

(86) PCT No.: PCT/JP2022/044052
§ 371 (c)(1),
(2) Date: May 24, 2024

(87) PCT Pub. No.: WO2023/100899
PCT Pub. Date: Jun. 8, 2023

(65) Prior Publication Data

US 2025/0035859 A1 Jan. 30, 2025

(30) Foreign Application Priority Data

Nov. 30, 2021 (JP) ................................ 2021-194718

(51) Int. Cl.
*G02B 6/38* (2006.01)

(52) U.S. Cl.
CPC ................................ *G02B 6/3853* (2013.01)

(58) Field of Classification Search
None
See application file for complete search history.

(56) References Cited

U.S. PATENT DOCUMENTS

| | | | | |
|---|---|---|---|---|
| 2016/0282576 | A1 | 9/2016 | Nishimura | |
| 2016/0356962 | A1 | 12/2016 | Moriyama | |
| 2018/0239092 | A1* | 8/2018 | Childers | G02B 6/3839 |
| 2020/0049900 | A1 | 2/2020 | Childers | |
| 2020/0103596 | A1 | 4/2020 | Tsunoda et al. | |
| 2022/0003940 | A1 | 1/2022 | Nakama | |
| 2023/0251434 | A1* | 8/2023 | Yakabe | G02B 6/3881 385/79 |

FOREIGN PATENT DOCUMENTS

| | | |
|---|---|---|
| JP | 2016-180946 A | 10/2016 |
| JP | 2016-224346 | 12/2016 |
| JP | 2020-091466 | 6/2020 |
| WO | 2018229992 A1 | 12/2018 |

OTHER PUBLICATIONS

International Search Report from International Application No. PCT/JP2022/044052 mailed Feb. 7, 2023.

* cited by examiner

*Primary Examiner* — Chad H Smith
(74) *Attorney, Agent, or Firm* — Shih IP Law Group, PLLC

(57) ABSTRACT

An optical connector of the present invention comprises: a holding part, for holding an end of one optical transmission body; a positioning part that is brought into contact with part of an end surface of the optical transmission body in order to effect positioning of the end surface; a first optical part, and a second optical part When the part of the end surface is brought into contact with the positioning part, a space between the first optical part and the end surface communicates with the outside via a gap between the optical connector and the end surface.

6 Claims, 18 Drawing Sheets

OPTICAL CONNECTOR AND OPTICAL CONNECTOR MODULE

TECHNICAL FIELD

The present invention relates to an optical connector and an optical connector module.

BACKGROUND ART

Conventionally used for optical communications that uses an optical transmission member, such as an optical fiber or an optical waveguide, is an optical module including a light emitting element such as a surface-emitting laser (for example, a vertical cavity surface emitting laser (VCSEL)) or light receiving element such as a photodetector. Such an optical module includes a photoelectric conversion element (light emitting element or light receiving element) and an optical connector for holding an optical transmission member.

Patent Literature (hereinafter, referred to as PTL) 1 describes an optical connector for connecting a substrate including optical elements disposed thereon to optical fibers. The optical connector described in PTL 1 is disposed between the substrate and a ferrule holding the optical fibers. The optical connector includes an element-side end surface, a connector-side end surface, and optical fiber holes. Optical fibers are respectively disposed in the plurality of optical fiber holes.

In PTL 1, the optical connectors are connected to the substrate and the ferrule is fixed to the optical connector, thereby optically connecting the optical elements with the optical fibers fixed to the ferrule. At this time, the end surface of the optical fiber fixed to the ferrule and the end surface of the optical fiber disposed in the optical connector are disposed to face each other.

When the optical connector of PTL 1 is used as a receiving optical connector, light emitted from the optical fiber fixed to the ferrule is transmitted through the optical fiber disposed in the optical connector and reaches the optical element disposed on the substrate.

In addition, optical connectors for optically coupling single-mode optical fibers to each other are known. A single-mode optical fiber is fixed so that the end surface thereof faces an optical connector. By connecting optical connectors, to which optical fibers are respectively fixed, to each other, the optical fibers are optically connected to each other.

CITATION LIST

Patent Literature

PTL 1
Japanese Patent Application Laid-Open No. 2016-180946

SUMMARY OF INVENTION

Technical Problem

Typically, the end surface of a single-mode optical fiber is inclined at, for example, 8° from the viewpoint of eliminating or reducing return light. An optical fiber with an inclined end surface has a narrower tolerance during assembly than an optical fiber with a non-inclined end surface. On the other hand, an optical fiber with a non-inclined end surface causes more return light than an optical fiber with an inclined end surface.

An object of the present invention is to provide an optical connector capable of reducing the return light of the light emitted from the end surface of an optical transmission member even when the inclination angle of the end surface of the optical transmission member is small. Another object of the present invention is to provide an optical connector module including the optical connector.

Solution to Problem

[1] An optical connector for optically coupling optical transmission members to each other, the optical connector including: a holding part for holding an end portion of an optical transmission member that is one of the optical transmission members; a first optical part for allowing light from an end surface of the optical transmission member to enter an inside of the optical connector, or for emitting light traveling through the inside of the optical connector toward the end surface; and a second optical part for allowing light from another optical connector holding another optical transmission member of the optical transmission members to enter the inside of the optical connector, or for emitting light traveling through the inside of the optical connector toward the other optical connector, wherein
a space between the first optical part and the end surface communicates with an outside of the optical connector through a gap between the optical connector and the end surface.

[2] The optical connector according to [1], wherein the first optical part includes a curved surface portion.

[3] The optical connector according to [1], wherein an intersection of an optical axis of light emitted from the optical transmission member and the first optical part is on a curved surface.

[4] The optical connector according to any one of [1] to [3], further including: a positioning part configured to contact a portion of the end surface of the optical transmission member and position the end surface, wherein
the first optical part is disposed at a position such that the first optical part does not contact the end surface when the portion of the end surface is in contact with the positioning part, and when the portion of the end surface is brought into contact with the positioning part, the space between the first optical part and the end surface communicates with the outside through the gap between the optical connector and the end surface.

[5] The optical connector according to [4], wherein the positioning part does not contact a core of the optical transmission member.

[6] The optical connector according to [4], wherein the positioning part contacts a lower portion of the end surface.

[7] The optical connector according to [4], wherein the positioning part contacts an upper portion of the end surface.

[8] The optical connector according to [4], wherein the positioning part contacts both side portions of the end surface.

[9] The optical connector according to [4], wherein when the portion of the end surface is brought into contact with the positioning part, the space communicates with the outside through a gap between the optical connector and an upper portion of the end surface.

[10] The optical connector according to [4], wherein when the portion of the end surface is brought into contact with the positioning part, the space communicates with the outside through gaps between the optical connector and both side portions of the end surface.

[11] The optical connector according to any one of [1] to [10], wherein the holding part includes a plurality of grooves formed on an inner surface of a recess of the holding part.

[12] An optical connector module, including: an optical transmission member; and the optical connector according to any one of [1] to [11], wherein the space between the first optical part and the end surface is filled with a cured product of an optically transparent resin composition.

[13] An optical connector module, including: an optical transmission member; and the optical connector according to [11] or [12], wherein:

the optical connector module further includes a lid disposed opposite the holding part across the optical transmission member, the lid being disposed in the recess, and a distance between the lid and the first optical part is within a range of 0.05 to 0.4 mm.

Advantageous Effects of Invention

The present invention can provide an optical connector capable of reducing the return light of the light emitted from the end surface of an optical transmission member even when the inclination angle of the end surface of the optical transmission member is small. The present invention can also provide an optical connector module including the optical connector.

DESCRIPTION OF EMBODIMENTS

Hereinafter, an optical connector and an optical connector module according to an embodiment of the present invention will be described in detail with reference to the attached drawings.

Embodiment 1

(Configuration of Optical Connector Module)

Figure 1:
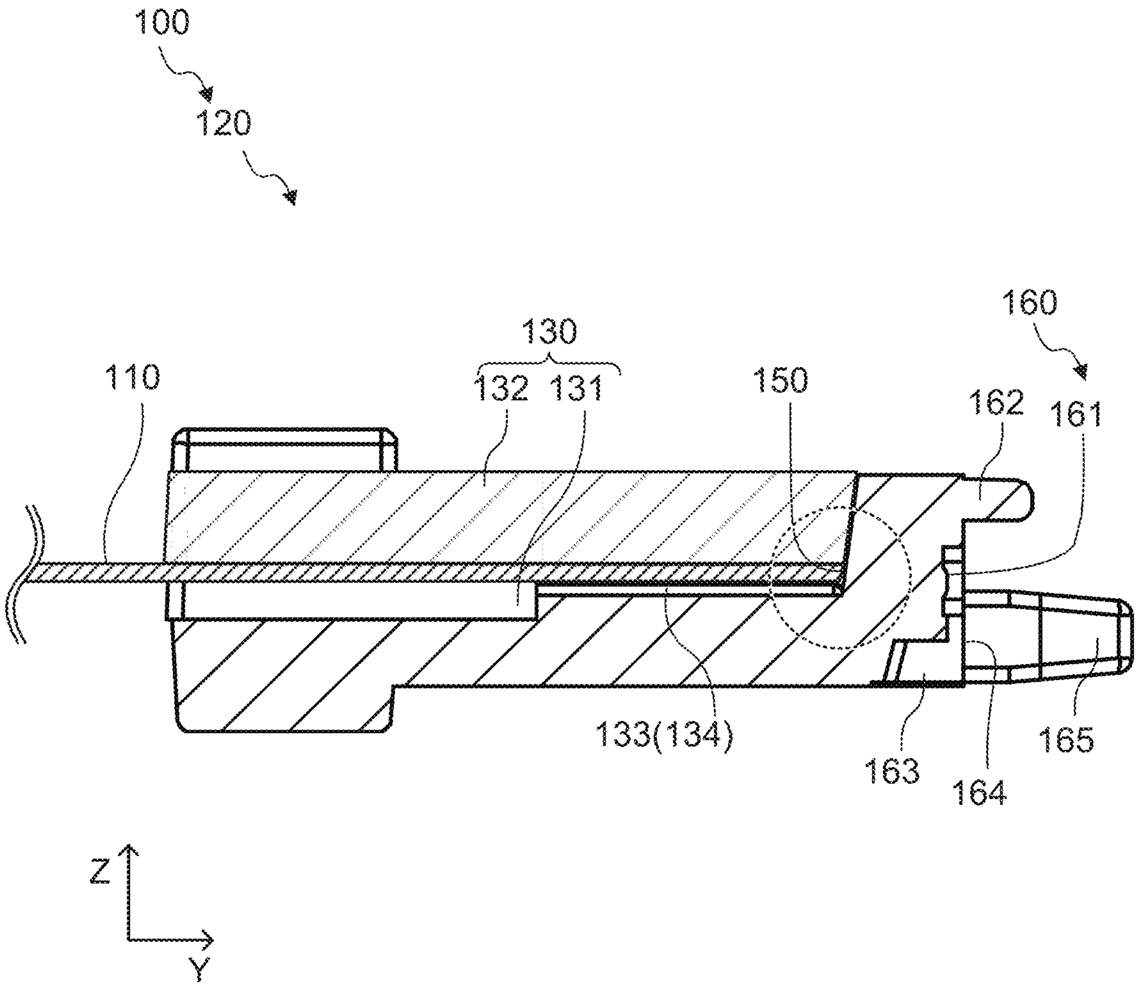
FIG. 1 is a cross-sectional view of an optical connector module.

FIG. 1 is a cross-sectional view illustrating the configuration of optical connector module 100 according to Embodiment 1.

In the following description, the direction in which optical transmission members 110 are disposed in parallel (the direction in which convex surfaces 161 of second optical parts 160 are arranged) is referred to as the "first direction" or the "X direction"; the direction orthogonal to the X direction when second optical parts 160 are viewed from the front (when viewed in the direction along the optical path between the two optical connectors 120) is referred to as a "second direction" or a "Z direction"; and the direction orthogonal to the X direction and the Z direction is referred to as the "third direction" or the "Y direction."

As illustrated in FIG. 1, optical connector module 100 according to the present embodiment includes optical transmission members 110 and optical connector 120. Optical connector 120 in the present invention is also generally referred to as a ferrule with lenses. The two optical connector modules 100 are used as a set (used in a pair). With respect to one optical connector 120 holding a plurality of optical transmission members, the other optical connector 120 having the same shape and holding a plurality of different optical transmission members 110 is turned upside down, then optical connectors 120 are connected to each other, thereby optically coupling the plurality of optical transmission members with the plurality of different optical transmission members 110.

Optical connector module 100 can be used with a housing, a spring clamp structure, and the like (not illustrated). Further, optical connector module 100 may optically couple an optical fiber that is optical transmission member 110 with an optical waveguide that is optical transmission member 110. In this case, optical transmission members 110 are disposed on a silicon substrate. An optical circuit (PIC: photonic integrated circuit) is configured by optical transmission members 110, which are optical waveguides, and the silicon substrate. Optical transmission member 110 may be located at any position, and the optical transmission member may be disposed so as to protrude upward from a recess formed on the upper surface of the optical circuit, or may be embedded inside the optical circuit. In addition, optical connector module 100 may optically couple optical transmission members 110 to each other by being connected to an optical transceiver. For example, multi-fiber push on (MPO) ferrule is used on the connection side of the optical transceiver, and the MPO ferrule includes short optical transmission members 110.

The type of optical transmission member 110 is not limited. Examples of optical transmission member 110 include optical fibers and optical waveguides. Optical transmission member 110 includes core 111 and cladding 112 (FIG. 5B). The number of optical transmission members 110 is not limited. In the present embodiment, the number of optical transmission members 110 is 16. The end portion of optical transmission member 110 is disposed in holding part 130 of optical connector 120. In the present embodiment, optical transmission member 110 is an optical fiber. In addition, the optical fiber may be a single-mode optical fiber or a multi-mode optical fiber. In the present embodiment, the optical fiber is a single-mode optical fiber. For example, the diameter of core 111 of a single-mode optical fiber is approximately 8 to 9 μm, and the diameter of core 111 of a multi-mode optical fiber is approximately 50 to 62.5 μm. The inclination angle of the end surface of optical transmission member 110 is not limited. The inclination angle of end surface 113 of optical transmission member 110 is, for example, 0 to 10°. In the present embodiment, the inclination angle of the end surface of optical transmission member 110 is 8°. The inclination angle may be less than 8°. Here, the inclination angle of end surface 113 of optical transmission member 110 refers to the angle of the end surface with respect to a plane orthogonal to the direction in which optical transmission member 110 extends (Y direction). The inclination angle of end surface 113 of optical transmission member 110 is preferably the same as the inclination angle of positioning part 140 with respect to the axis of groove 134 of holding part 130.

As described below in detail, optical transmission members 110 are fixed to optical connector 120 by the following: an optically transparent resin composition fills the spaces around the end portions of optical transmission members 110 while portions of end surfaces 113 of optical transmission members 110 abut against positioning part 140 of the optical connector 120, and optical transmission members are pressed down by lid 132. In the present embodiment, positioning part 140 contacts a portion of cladding 112, and first optical part 150 of optical connector 120 faces core 111.

(Configuration of Optical Connector)

Figure 2:
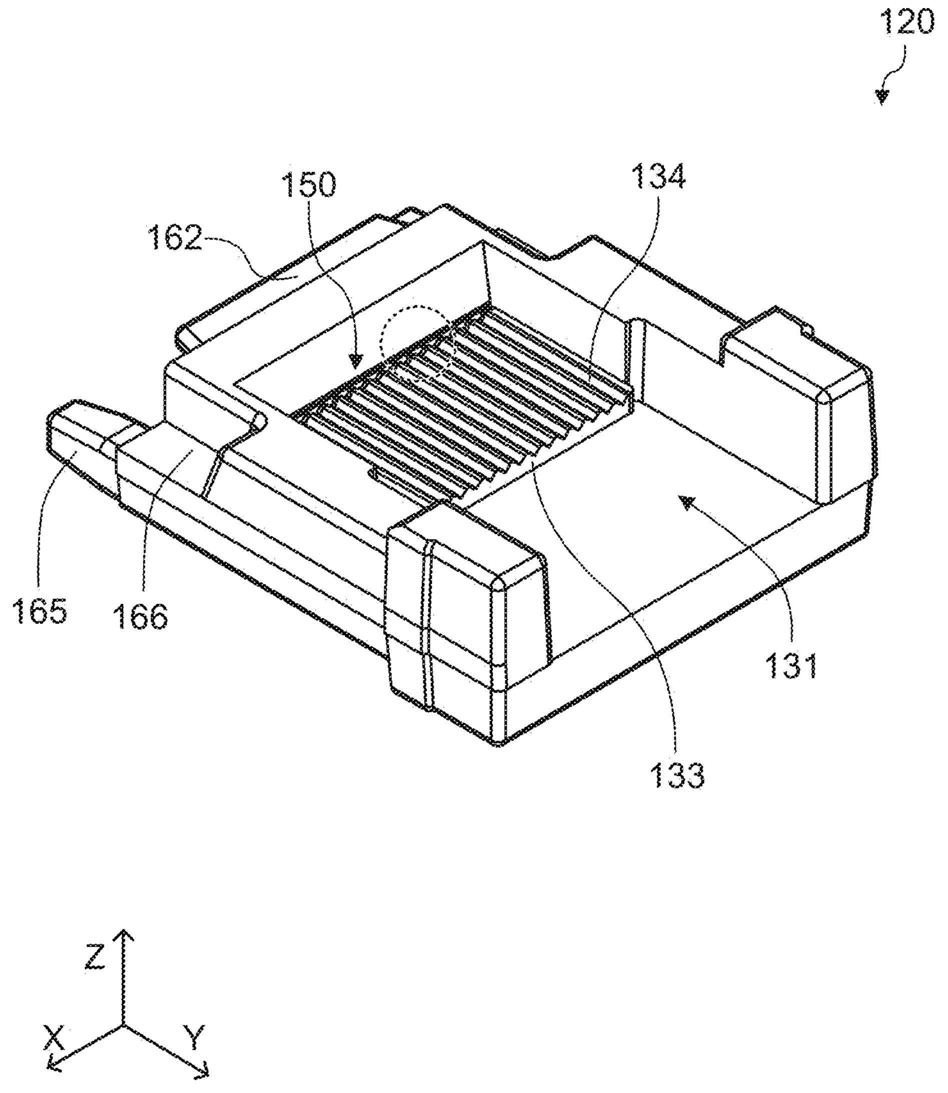
FIG. 2 is a perspective view of an optical connector according to Embodiment 1 with the lid thereof removed.
Figure 3:
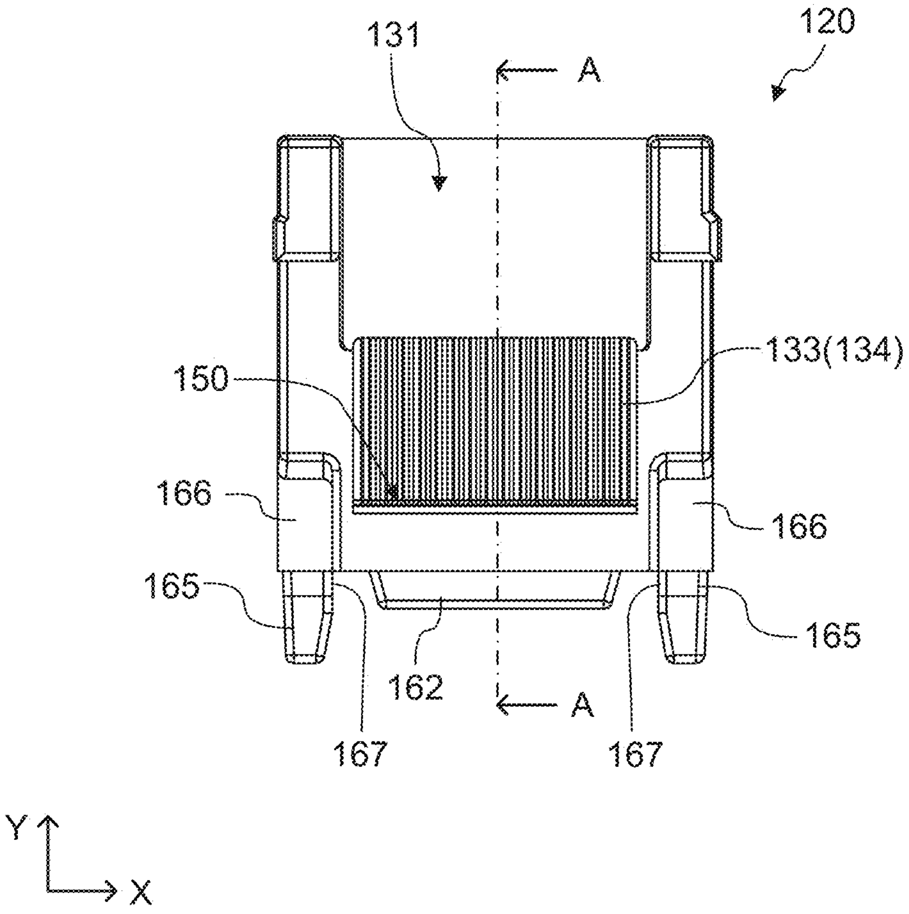
FIG. 3 is a plan view of the optical connector according to Embodiment 1 with the lid removed.
Figure 4A:
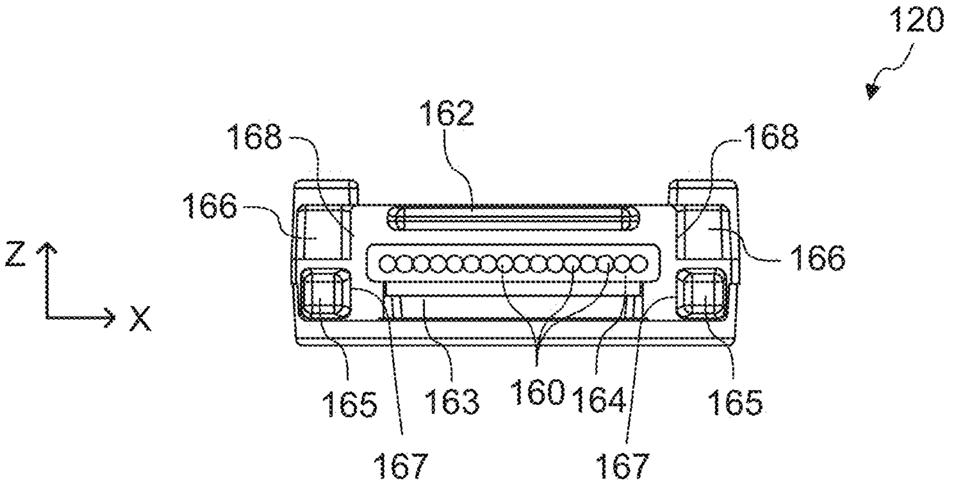
FIGS. 4A to 4C illustrate the configuration of the optical connector according to Embodiment 1 with the lid removed.
Figure 4B:
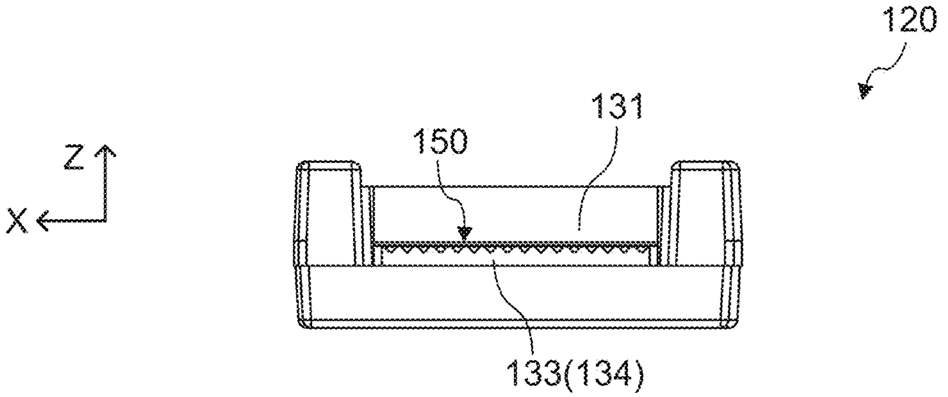
Figure 4C:
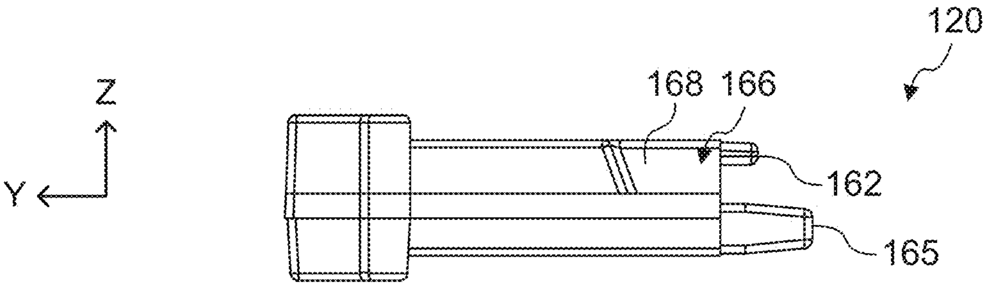
Figure 5:
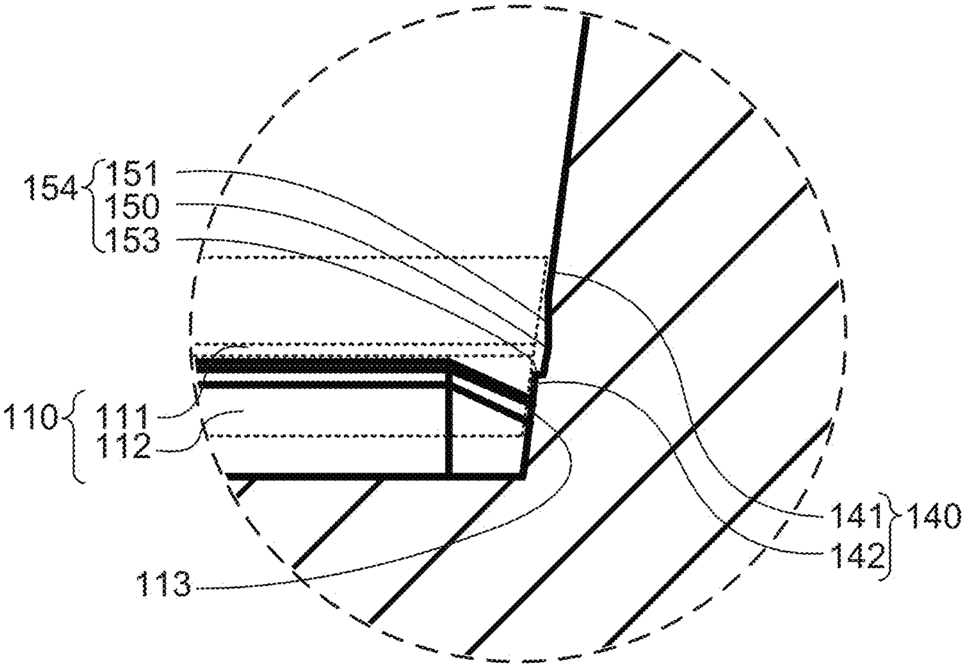
FIG. 5 is an enlarged view of the region indicated by the dashed line in FIG. 1.

FIG. 2 is a perspective view of optical connector 120 according to Embodiment 1 with lid 132 removed. FIG. 3 is a plan view of optical connector 120 according to Embodiment 1 with lid 132 removed. FIG. 4A is a front view, FIG. 4B is a rear view, and FIG. 4C is a left side view each illustrating optical connector 120 according to Embodiment 1 with lid 132 removed. FIG. 5 is an enlarged view of the region indicated by the dashed line in FIG. 1.

As illustrated in FIGS. 2, 3, 4A to 4C, and FIG. 5, optical connector 120 is a substantially rectangular parallelepiped member. Optical connector 120 includes holding part 130, positioning part 140, first optical part 150, and second optical parts 160. In the present embodiment, in addition to the above configuration, optical connector 120 further includes protrusion 162, recess 163, engaging protrusions 165, and engaging recesses 166.

Optical connector 120 is formed of a material that allows light having a wavelength used for optical communication to pass therethrough. Examples of the material of optical connector 120 include transparent resins including polyetherimide (PEI), such as ULTEM, and cyclic olefin resins. In addition, optical connector 120 may be produced by injection molding, for example.

Holding part 130 holds optical transmission members 110. Holding part 130 may have any configuration as long as the holding part can hold optical transmission members 110. Holding part 130 may be configured to press to hold optical transmission members 110 or may be configured to allow thereto insertion of optical transmission members 110 to hold the optical transmission members. In the present embodiment, holding part 130 includes recess 131 for holding (herein simply referred to as "holding recess 131") and lid 132 (see FIG. 1), and holds optical transmission members 110 disposed in holding recess 131 by pressing optical transmission members 110 with lid 132.

Holding recess 131 opens into the top and back surfaces of optical connector 120. The shape of holding recess 131 in plan view is not limited as long as the plurality of optical transmission members 110 can be disposed at appropriate positions. In the present embodiment, holding recess 131 has a rectangular shape in plan view.

In the present embodiment, plurality of elongated protrusions 133 are disposed on the bottom surface of holding recess 131, and groove 134 is formed between elongated protrusions 133. Groove 134 extends in one direction (Y direction), and a plurality of grooves 134 are disposed along the first direction (X direction). Groove 134 may have any configuration as long as optical transmission member 110 can be guided by disposing optical transmission member 110 along groove 134 to bring end surface 113 of optical transmission member 110 into contact with positioning part 140.

Grooves 134 may be disposed on the entire bottom surface of holding recess 131, or may be disposed on a portion of the bottom surface of holding recess 131. In the present embodiment, grooves 134 are disposed in a region of the bottom surface of holding recess 131—the region on the first optical part 150 side. The number of grooves 134 may be any number as long as the number is greater than or equal to the number of optical transmission members 110 to be installed. In the present embodiment, the number of grooves 134 is the same as the number of optical transmission members 110. That is, the number of grooves 134 is 16 in the present embodiment. The cross-sectional shape (XZ cross section) of groove 134 is not limited. Groove 134 may be a V-shaped groove or a U-shaped groove. In the present embodiment, groove 134 is a V-shaped groove. The depth of groove 134 is preferably set in such a way that the upper end portion of optical transmission member 110 protrudes beyond the upper end portion of groove 134 when optical transmission member 110 is disposed in groove 134. This configuration allows below-described lid 132 to press optical transmission members 110 toward grooves 134, thereby preventing optical transmission members 110 from coming off.

In the present embodiment, the axis of groove 134 is disposed along the third direction (Y direction) when optical connector 120 is cut along the YZ plane. That is, the axis of groove 134 is parallel to the back surface of optical connector 120.

Lid 132 presses optical transmission members 110 against grooves 134 of optical connector 120. Lid 132 is disposed to cover holding recess 131. Lid 132 may have any configuration as long as the lid can exhibit the above function. The distance between lid 132 and first optical part 150 is preferably within a range of 0.05 to 0.4 mm. When the distance between lid 132 and first optical part 150 is not within the above range, the following may occur: the resin composition (adhesive) does not properly fill the space, or the tips of optical transmission members 110 are not properly fixed.

Positioning part 140 contacts a portion of end surface 113 of optical transmission member 110 and positions end surface 113. More specifically, positioning part 140 is in contact with a portion of the outer edge of end surface 113, that is, a portion of the end surface of cladding 112. Preferably, positioning part 140 does not contact the center portion of end surface 113, that is, core 111. In addition, positioning part 140 is disposed in such a way that when a portion of end surface 113 is brought into contact with positioning part 140, the space between first optical part 150 and end surface 113 communicates with the outside through the gap between optical connector 120 and end surface 113. Positioning part 140 may have any configuration as long as the positioning part can contact end surface 113 as described above. As illustrated in FIG. 5, positioning part 140 includes first positioning part 141 and second positioning part 142 in the present embodiment. In the present embodiment, positioning part 140 contacts the upper portion and the lower portion of end surface 113 of optical transmission member 110 (optical fiber). First positioning part 141 contacts the upper portion of the end surface of optical transmission member 110 (optical fiber). In addition, second positioning part 142 contacts the lower portion of the end surface of optical transmission member 110 (optical fiber). Herein, the upper portion of end surface 113 refers to the region above the center of end surface 113 when optical transmission member 110 held by holding part 130 is viewed along the axial direction (Y direction). In the present embodiment, the upper portion of end surface 113 refers to a region in the end surface of cladding 112 in end surface 113 of optical transmission member 110, the region located above end surface 113 of core 111. In addition, the lower portion of end surface 113 refers to a region below the center of end surface 113 when optical transmission member 110 held by holding part 130 is viewed along the axial direction (Y direction). In the present embodiment, the lower portion of end surface 113 refers to a region in end surface 113 of cladding 112 in end surface 113 of optical transmission member 110, the region located below the end surface of core 111.

The inclination angle of a surface of positioning part 140—the surface contacting end surface 113 of optical transmission member 110—is preferably the same as the inclination angle of end surface 113. In the present embodiment, the inclination angle of the surface of positioning part 140 contacting end surface 113 of optical transmission member 110 is the same as the inclination angle of end surface 113. Herein, the inclination angle of the surface of positioning part 140 contacting end surface 113 of optical transmission member 110 is an angle of the surface with respect to the third direction (Z direction) in the YZ plane. In the present embodiment, the angle is 8°.

First optical part 150 is disposed at a position such that the first optical part does not contact end surface 113 when a portion of end surface 113 is in contact with positioning part 140. In addition, first optical part 150 disposed at a position that faces the end surface of core 111 in end surface 113 of optical transmission member 110. First optical part 150 allows thereon incidence of light emitted from end surface 113 of optical transmission member 110, or allows therefrom emission of light, having traveled inside optical connector 120, toward end surface 113 of optical transmission member 110. By separating first optical part 150 from end surface 113 of optical transmission member 110, it is possible to prevent incidence of light—the light emitted from end surface 113 of optical transmission member 110 and reflected by first optical part 150—on end surface 113 of optical transmission member 110 again. In addition, the distance between first optical part 150 and end surface 113 of optical transmission member 110 is preferably as long as possible from the viewpoint of reducing reflected light at first optical part 150 but is preferably as short as possible from the viewpoint of positioning accuracy when disposing optical transmission member 110. The distance between first optical part 150 and end surface 113 of optical transmission member 110 is appropriately set also in view of the size of optical connector 120. The distance between first optical part 150 and end surface 113 of optical transmission member 110 is within the range of 0.001 to 0.1 mm.

First optical part 150 may have any shape as long as the first optical part can exhibit the above function. In the present embodiment, first optical part 150 is a portion of an elongated recess extending in the first direction (X direction). Elongated recess 154 includes first inner surface 151, first optical part 150, and second inner surface 153. The inner surfaces of elongated recess 154 may each be curved or flat surface. In the present embodiment, the inner surfaces of elongated recess 154 including first optical part 150 are all flat surfaces. In addition, first optical part 150 may include a curved surface portion. In other words, it is preferable that the intersection of the optical axis of light emitted from optical transmission member 110 and first optical part 150 be on a curved surface. In this case, it is preferable that the region onto which the light emitted from optical transmission member 110 is incident is a curved surface portion.

First inner surface 151 is connected to first positioning part 141 and first optical part 150, in the YZ cross section. First inner surface 151 is disposed along the second direction (Z direction).

First optical part 150 is connected to first inner surface 151 and second inner surface 153, in the YZ cross section. The inclination angle of first optical part 150 is preferably the same as the inclination angle of end surface 113 of optical transmission member body 10 and as the inclination angle of the surface of positioning part 140 contacting end surface 113 of optical transmission member 110. That is, the inclination angle of first optical part 150 is 8° in the present embodiment.

Second inner surface 153 is connected to first optical part 150 and second positioning part 142, in the YZ cross section. In the present embodiment, the inclination angle of second inner surface 153 is 90° with respect to end surface 113 of optical transmission member 10 and to the surface of positioning part 140 contacting end surface 113 of optical transmission member 110. By configuring first inner surface 151, first optical part 150, and second inner surface 153 as described above, the mold release process during injection molding can be performed smoothly.

In the YZ cross section, the angle between positioning part 140 and the axis of groove 134 is not limited. In the YZ cross section, the angle between positioning part 140 and the axis of groove 134 may be an acute angle, a right angle, or an obtuse angle. In the present embodiment, the angle is 98° (obtuse angle). In the present embodiment, as illustrated in FIG. 5, the surfaces of positioning part 140 (surfaces of first positioning part 141 and second positioning part 142) are inclined with respect to the back surface of optical connector 120, and the axis of optical transmission member 110 is parallel to the back surface of optical connector 120. In addition, in the present embodiment, surfaces—the surfaces contacting end surface 113 of optical transmission member 110—of positioning part 140 (surfaces of first positioning part 141 and second positioning part 142) are inclined away from second optical part 160 as the surfaces approach the back surface of optical connector 120.

Second optical part 160 allows light incident on first optical part 150 and traveling through the inside of an optical connector 120 to be emitted to the outside, or allows light from another optical connector 120 to enter the inside of the optical connector 120. Second optical part 160 may have any shape as long as the second optical part can exhibit the above function. Second optical part 160 may be a convex surface or a flat surface. In the present embodiment, second optical part 160 is a convex surface. Second optical parts 160 are disposed in parallel in the first direction (X direction), and allow therefrom emission of light incident on first optical part 150 toward another optical connector 120 or allow thereon incidence of light from another optical connector 120. Second optical part 160 is disposed on the front of optical connector 120. The shape of second optical part 160 in plan view is not limited. Second optical part 160 may have a circular or rectangular shape in plan view. In the present embodiment, second optical part 160 has a circular shape in plan view. In addition, the number of second optical parts 160 is the same as the number of optical transmission members 110. That is, the number of second optical parts 160 is 16 in the present embodiment.

When second optical parts 160 are viewed from the front (when second optical parts 160 are viewed along the optical path between an optical connector 120 and another optical connector 120), protrusion 162 and recess 163 are disposed at respective positions symmetrical with respect to a reference straight line parallel to the first direction (X direction). In the present embodiment, when second optical parts 160 are viewed from the front, protrusion 162 and recess 163 are disposed in the second direction (Z direction) orthogonal to the first direction (X direction) with second optical parts 160 between protrusion 162 and recess 163. In the present embodiment, on the front of optical connector 120, contact surface 164, on which second optical parts 160, protrusion 162, and recess 163 are not disposed, is a flat surface. Contact surface 164 contacts a contact surface 164 of another connector 120. Contact surface 164 may be disposed perpendicular to the back surface of optical connector 120, or may be disposed so as to be inclined with respect to the back surface of optical connector 120. In the present embodiment, contact surface 164 is disposed perpendicular to the back surface of optical connector 120.

Protrusion 162 has a shape that allows the protrusion to be fitted into recess 163 of another optical connector 120. In the present embodiment, protrusion 162 is disposed on the front side (and upper side) on the front of optical connector 120. Protrusion 162 may have any shape as long as the protrusion can prevent the displacement of optical connector 120 in the second direction (Z direction). In the present embodiment, protrusion 162 has a shape of an elongated protrusion wider in the first direction (X direction).

Recess 163 has a shape that allows the recess to be fitted with protrusion 162 of another optical connector 120. Recess 163 may have any shape as long as the recess can exhibit the above function. In the present embodiment, recess 163 is disposed on the back side (and lower side) on the front of optical connector 120. The recess may have any shape as long as the recess can prevent the displacement of optical connector 120 in the second direction. In the present embodiment, recess 163 has a shape of an elongated recess wider in the first direction (X direction) and opening into the front.

In the present embodiment, protrusion 162 is disposed on the front surface side (upper surface side) compared to second optical parts 160, and recess 163 is disposed on the back surface side (lower surface side) compared to second optical parts 160. However, the disposed positions of the protrusion and the recess may be reversed. That is, recess 163 may be disposed on the front side compared to second optical parts 160 and protrusion 162 may be disposed on the back surface side compared to second optical parts 160. Protrusion 162 and recess 163 preferably have complementary shapes.

Engaging protrusions 165 are disposed in optical connector 120 at the positions located on the back surface side at both end portions in the first direction (X direction). Engaging protrusion 165 has a rectangular column shape protruding from the front of optical connector 120. Engaging protrusions 165 each include inward restricting surface 167 on the inner flat surface thereof.

Engaging recesses 166 respectively open into the corners of optical connector 120 on the front surface (and upper surface) side at both end portions in the first direction (X direction). Engaging recesses 166 each include outward restricting surface 168 on the inner flat surface thereof.

When an optical connector 120 is engaged with another optical connector 120, the positional restriction in the first direction (X direction) is achieved by the following configuration: at least the pair of inward restricting surfaces 167 of the optical connector 120 respectively contact with the pair of outward restricting surfaces 168 of the other optical connector 120; and at least the pair of outward restricting surfaces 168 of the optical connector 120 respectively contact with the pair of inward restricting surfaces 167 of the other optical connector 120.

(Method of Using Optical Connector Module)

In the following, a method of using optical connector module 100 will be described with reference to FIG. 6.

Figure 6:
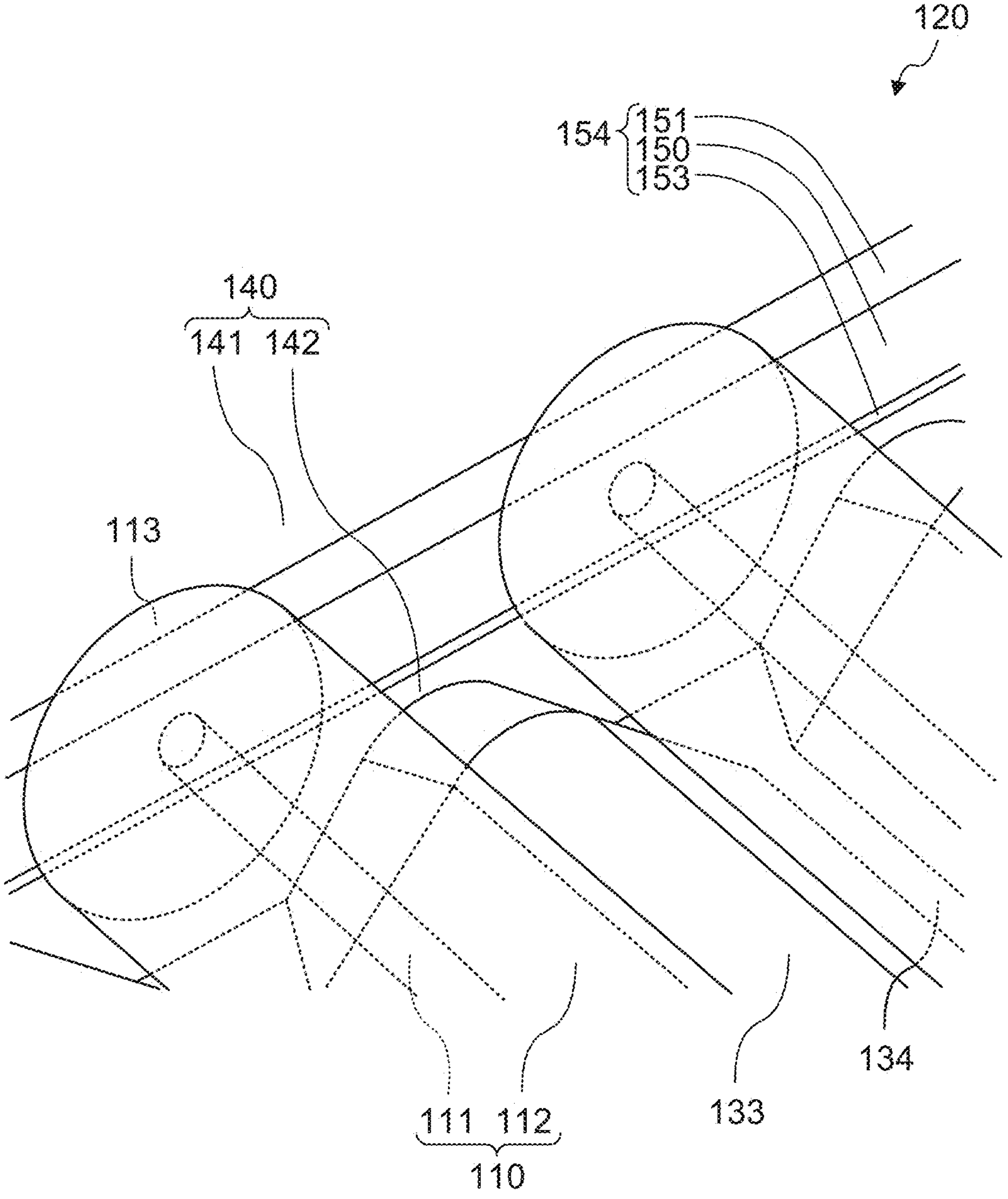
FIG. 6 schematically illustrates how optical transmission members are positioned with respect to the optical connector according to Embodiment 1.

FIG. 6 schematically illustrates how optical transmission members 110 are positioned with respect to optical connector 120 according to Embodiment 1.

As illustrated in FIG. 6, in the present embodiment, end surfaces 113 of optical transmission members 110 are brought to abut against positioning part 140 (first positioning part 141 and second positioning part 142) of optical connector 120. As a result, cladding 112 of each optical transmission member 110 comes into contact with first positioning part 141 and second positioning part 142. At this time, the space between first optical part 150 and end surface 113 communicates with the outside of the optical connector through the gap between optical connector 120 and end surface 113. More specifically, the space between first optical part 150 and end surface 113 communicates with the outside through the gaps between optical connector 120 and both side portions of end surface 132.

A space between first optical part 150 and end surfaces 113 is then filled with an optically transparent resin composition (adhesive). At this time, the filling is performed so that the optically transparent resin composition contacts first optical part 150 and end surfaces 113. In the present embodiment, not only the spaces between first optical part 150 and end surfaces 113 but also the peripheries of the end portions of optical transmission members 110 are filled with the optically transparent resin composition. Lid 132 is then disposed to cover holding recess 131 in such a way that optical transmission members 110 are pressed against grooves 134 of optical connector 120. Optical transmission members 110 are fixed to optical connector 120 by curing the optically transparent resin composition (adhesive) as the last step.

Any resin composition may be used as long as the resin composition is optically transparent and can adhere optical transmission members 110 to optical connector 120. Examples of the resin composition include epoxy thermosetting resins, epoxy ultraviolet curable resins, and acrylic ultraviolet curable resins. The refractive index of the resin composition is preferably close to the refractive index of optical connector 120 and the refractive index of the core of optical transmission member 110. In the present embodiment, the resin composition is an epoxy thermosetting resin. Using an epoxy thermosetting resin can reduce the refraction of light emitted from optical transmission member 110 and refracted at first optical part 150, and also reduce reflection.

One optical connector module 100 is placed with its lid 132 facing upward, and another optical connector modules 100 is rotated (turned upside down) about a straight line along the first direction as a rotation axis. Protrusion 162 of the one connector optical connector module 100 is engaged with recess 163 of the other optical connector module 100, and recess 163 of the one optical connector module 100 is engaged with protrusion 162 of the other optical connector module 100. This configuration can restrict displacement between the one optical connector module 100 and the other optical connector module 100 in the second direction (Z direction). In addition, engaging protrusions 165 of the one optical connector module 100 are engaged with engaging recesses 166 of the other optical connector module 100, and engaging recesses 166 of the one optical connector module 100 are engaged with engaging protrusions 165 of the other optical connector module 100. This configuration can restrict displacement between the one optical connector module 100 and the other optical connector module 100 in the first direction (X direction). As a result, a plurality of optical transmission members 110 connected to the one optical connector module 100 are optically coupled with a plurality of optical transmission members 110 connected to the other optical connector module 100.

(Simulation)

Figure 7:
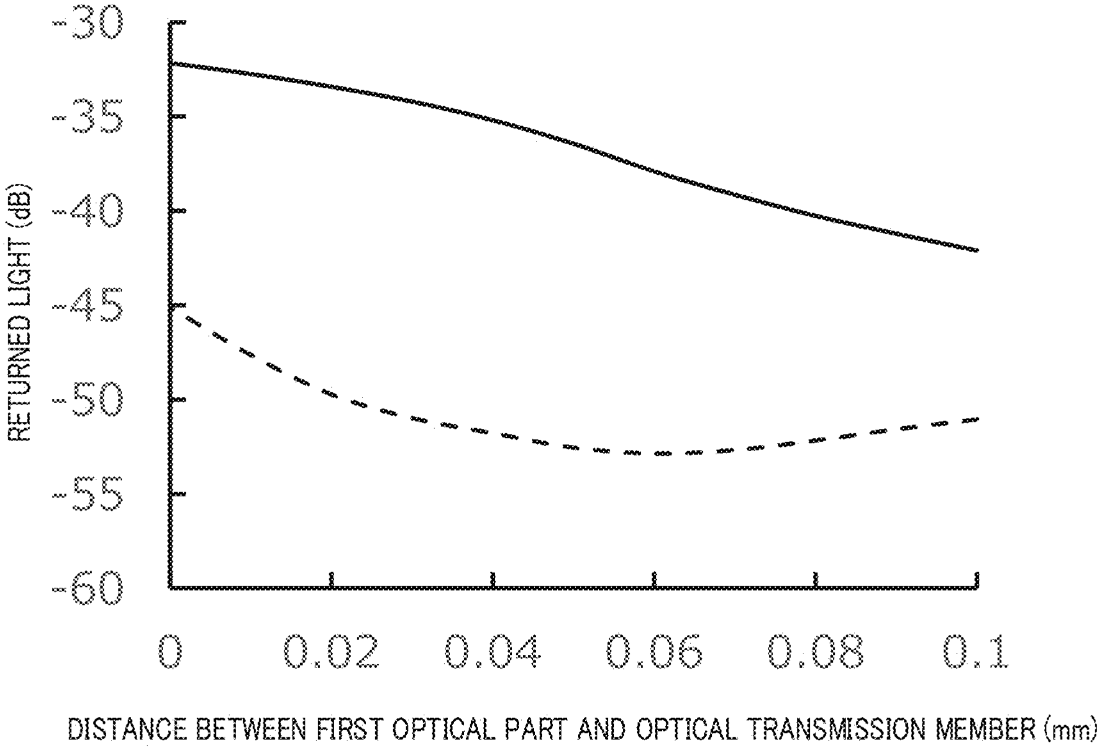
FIG. 7 is a graph indicating the relationship between return light and the distance between the first optical part and the end surface of the optical transmission member.

In optical connector module 100, the return light of light emitted from optical transmission member 110 is then simulated. Here, in optical connector module 100 according to Embodiment 1, the following light is examined: light emitted from the end surface of the core of optical transmission member 110, reflected by first optical part 150, and reaching the end surface of the core of optical transmission member 110. FIG. 7 is a graph indicating the relationship between the amount (dB) of return light and the distance (mm) between first optical part 150 and end surface 113 of optical transmission member 110. In FIG. 7, the horizontal axis represents the distance (mm) between first optical part 150 and end surface 113 of optical transmission member 110, and the vertical axis represents the amount (dB) of return light. In FIG. 7, the solid line shows the results of optical connector module 100 using optical transmission member 110 whose end surface has an inclination angle of 0°, and the dashed line shows the result of optical connector module 100 using optical transmission member 110 whose end surface has an inclination angle of 5°.

The solid line and dashed line in FIG. 7 show that the return light can be reduced even when the inclination angle of end surface 113 is smaller than that of the conventional optical connector module. It is also be shown that a longer distance between first optical part 150 and end surface 131 can obtain a better effect of reducing the return light.

(Effect)

According to optical connector module 100 of the present embodiment, first optical part 150 is separated from end surfaces 113 of optical transmission members 110, and therefore, light emitted from end surfaces 113 of optical transmission members 110 and reflected by first optical part 150 can be prevented from entering cores 111 of optical transmission members 110.

Embodiment 2

(Configurations of Optical Connector Module and Optical Connector)

In the following, optical connector module 200 according to Embodiment 2 will be described.

Figure 8:
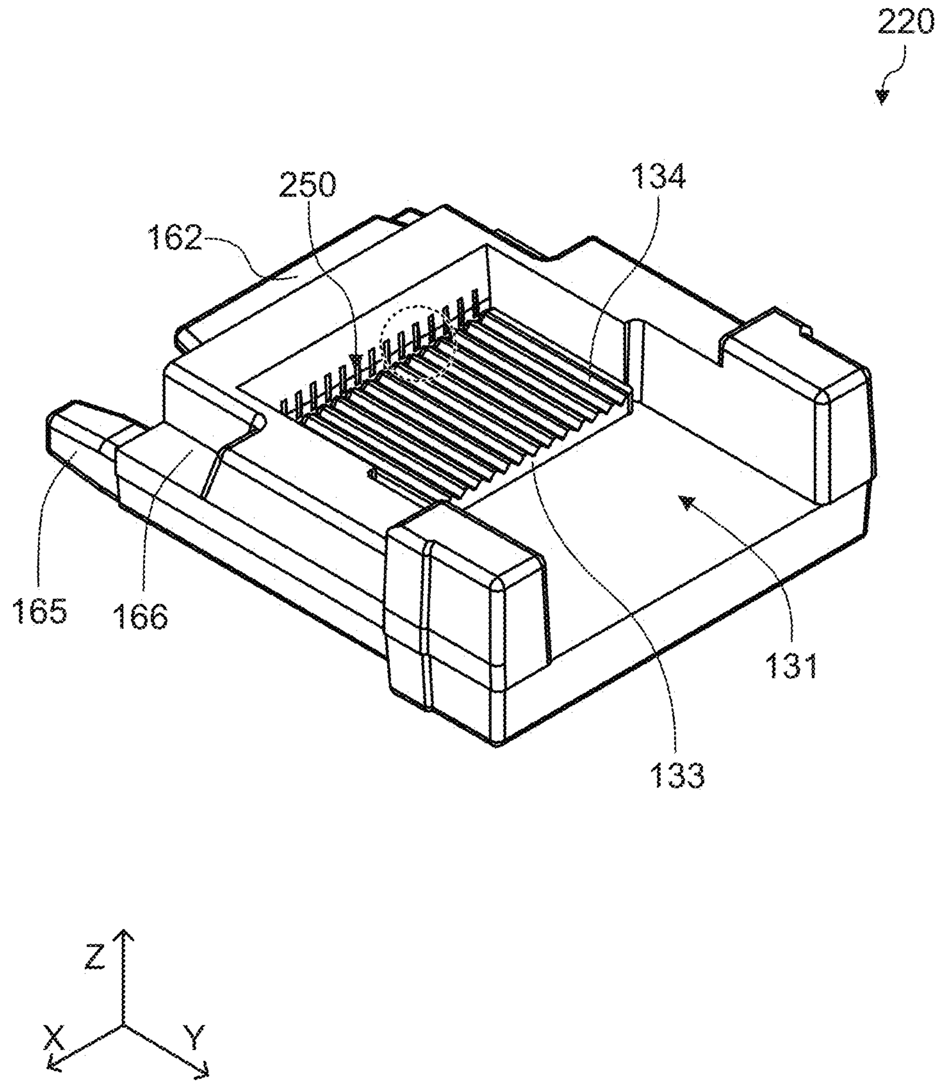
FIG. 8 is a perspective view of an optical connector according to Embodiment 2 with the lid thereof removed.
Figure 9:
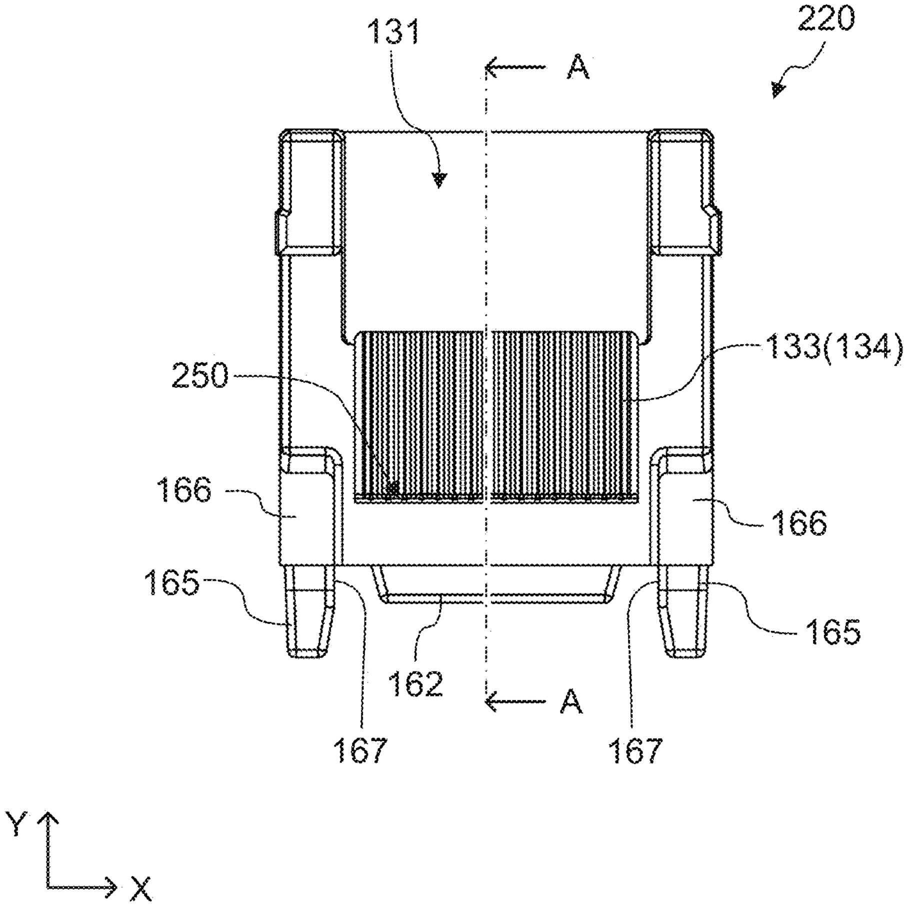
FIG. 9 is a plan view of the optical connector according to Embodiment 2 with the lid removed.
Figure 10A:
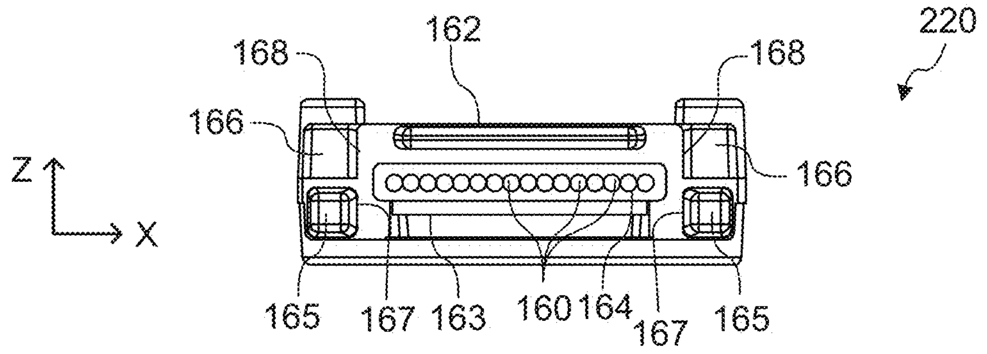
FIGS. 10A to 10D illustrate the configuration of the optical connector according to Embodiment 2 with the lid removed.
Figure 10B:
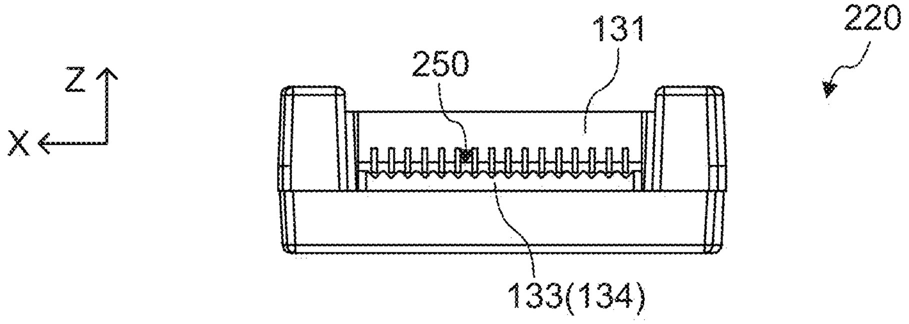
Figure 10C:
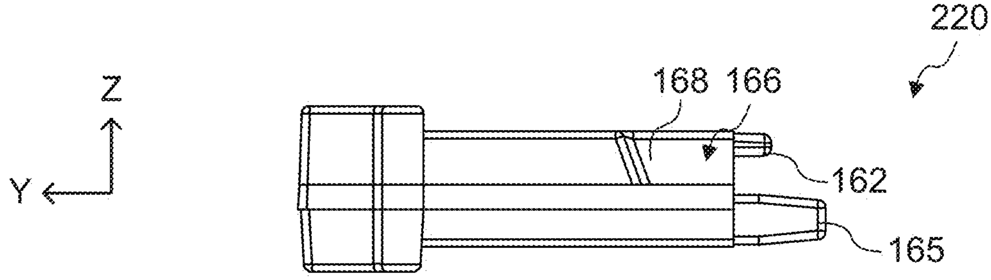
Figure 10D:
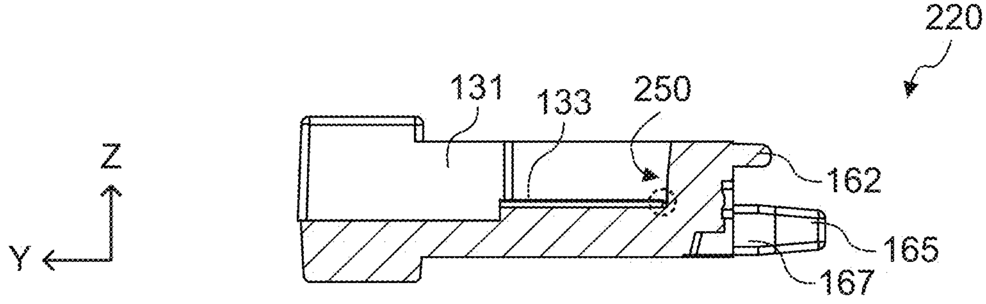
Figure 11:
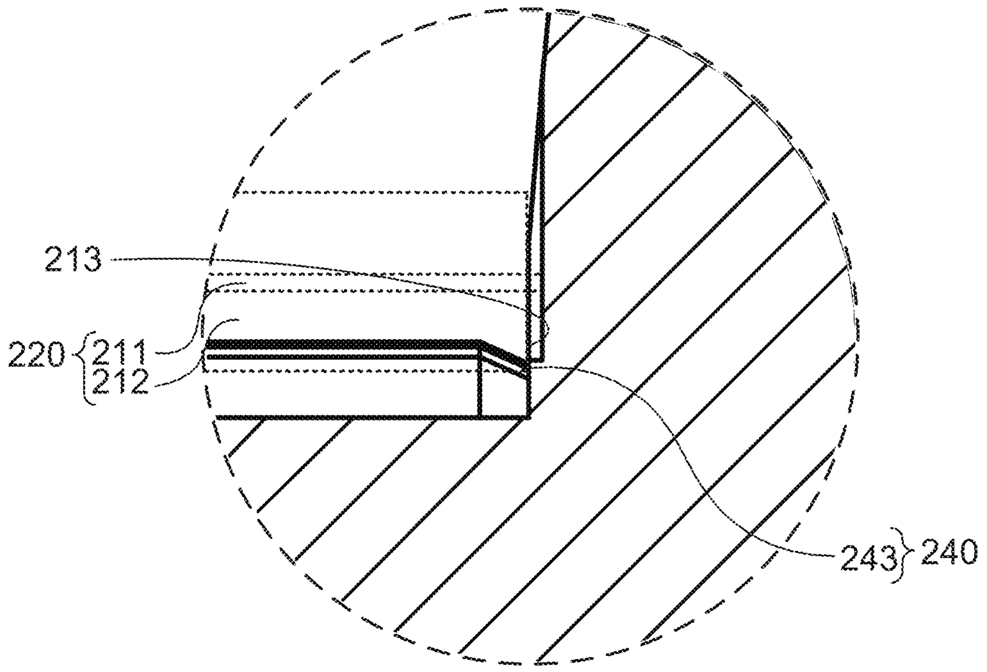
FIG. 11 is an enlarged view of the region indicated by the dashed line in FIG. 10D.

FIG. 8 is a perspective view of optical connector 220 according to Embodiment 2 with lid 132 removed. FIG. 9 is a plan view of optical connector 220 according to Embodiment 2 with lid 132 removed. FIG. 10A is a front view, FIG. 10B is a rear view, and FIG. 10C is a left side view each illustrating optical connector 220 according to Embodiment 2 with lid 132 removed, and FIG. 10D is a cross-sectional view taken along line A-A in FIG. 9. FIG. 11 is an enlarged view of the region indicated by the dashed line in FIG. 10D.

Optical connector module 200 according to the present embodiment includes optical transmission members 210 and optical connector 220.

Optical transmission member 210 includes core 211 and cladding 212. In the present embodiment, the inclination angle of end surface 213 of optical transmission member 210 is 0°. That is, in the YZ cross section, the inclination angle of end surface 213 of optical transmission member 110 in the present embodiment is along the direction in which optical transmission member 110 extends (Y direction).

Optical connector 220 includes holding part 130, positioning part 240, first optical part 250, and second optical parts 160. In the present embodiment, in addition to the above configuration, optical connector 220 further includes protrusion 162, recess 163, engaging protrusions 165, and engaging recesses 166. Holding part 130, second optical parts 160, protrusion 162, recess 163, engaging protrusions 165, and engaging recesses 166 in the present embodiment are the same as those in Embodiment 1; therefore, the descriptions of these components will be omitted.

Positioning part 240 in the present embodiment includes third positioning part 243. Third positioning part 243 contacts a portion of end surface 213 of optical transmission member 210 (optical fiber), that is, the lower portion and both side portions of end surface 213. Herein, the both side portions of end surface 213 refer to the regions each closer to the corresponding end of end surface 213 than the center of end surface 213 is when optical transmission member 210 held by holding part 130 is viewed along the axial direction (Y direction). In the present embodiment, the both side portions of end surface 213 refer to the regions each closer to the corresponding end of end surface 213 than the center of end surface 213 is when optical transmission member 210 held by holding part 130 is viewed along the axial direction (Y direction). That is, in the present embodiment, positioning part 240 contacts cladding 212 but does not contact core 211.

The inclination angle of a surface of positioning part 240—the surface contacting end surface 213 of optical transmission member 210—is preferably the same as the inclination angle of end surface 213. In the present embodiment, the inclination angle of the surface of positioning part 240 contacting end surface 213 of optical transmission member 210 is the same as that of end surface 213. In the present embodiment, the angle is 0°.

First optical part 250 is disposed at a position such that the first optical part does not contact end surface 213 when a portion of end surface 213 is in contact with positioning part 240, also in the present embodiment. In the present embodiment, first optical part 250 is a portion of a recess extending in the second direction (Z direction). First optical part 250 is disposed on a portion of the inner side surface of holding recess 131. In the present embodiment, first optical part 250 is parallel to end surface 213 of optical transmission member 210 and a surface of third positioning part 243—the surface contacting the end surface. In the present embodiment, the angle between positioning part 240 and the axis of groove 134 is 90° (right angle) in the YZ cross section.

(Method of Using Optical Connector Module)

In the following, a method of using optical connector module 200 will be described with reference to FIG. 12.

Figure 12:
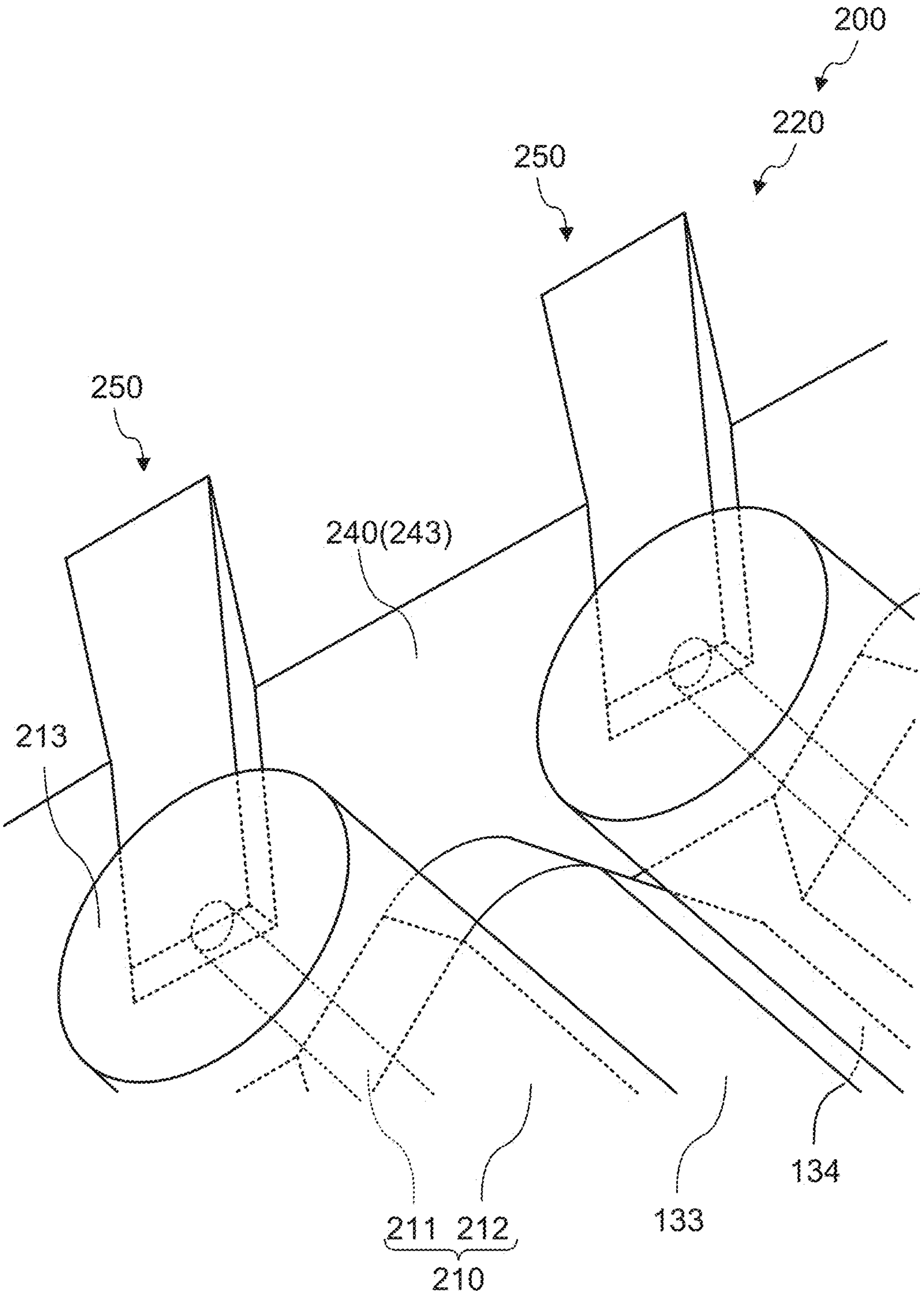
FIG. 12 schematically illustrates how optical transmission members are positioned with respect to the optical connector according to Embodiment 2.

FIG. 12 schematically illustrates how optical transmission members 210 are positioned with respect to optical connector 220 according to Embodiment 2.

As illustrated in FIG. 12, in the present embodiment, end surfaces 213 of optical transmission members 210 are brought to abut against positioning part 240 (third positioning part 243) of optical connector 220. As a result, cladding 212 of each optical transmission member 210 comes into contact with third positioning part 243. At this time, the space between first optical part 250 and end surface 213 communicates with the outside of the optical connector through the gap between optical connector 220 and end surface 213. More specifically, the space between first optical part 250 and end surface 213 communicates with the outside through the gap between optical connector 220 and the upper portion of the end surface.

The spaces between first optical part 250 and end surfaces 213 are then filled with an optically transparent resin composition. At this time, the filling is performed so that the optically transparent resin composition contacts first optical part 250 and end surfaces 213. In the present embodiment, the spaces between the first optical part 250 and the end surfaces 213 are filled with the optically transparent resin composition, and the optically transparent resin composition contacts the side surfaces of optical transmission members 210. When positioning part 240 is in contact with the entire end surface 213 of optical transmission member 210, there will be no space to be filled with the optically transparent resin composition, and no effect of reducing the return light can be obtained. Therefore, in the present invention, positioning part 240 is in contact with a portion of end surface 213 of optical transmission member 210. Lid 132 is then disposed to cover holding recess 131 in such a way that optical transmission members 210 are pressed against grooves 134 of optical connector 220. Optical transmission members 210 are fixed to optical connector 220 by curing the optically transparent resin composition as the last step. The other processes are the same as those in the method of using optical connector module 100 in Embodiment 1.

Embodiment 3

(Configurations of Optical Connector Module and Optical Connector)

In the following, optical connector module 300 according to Embodiment 3 will be described.

Figure 13:
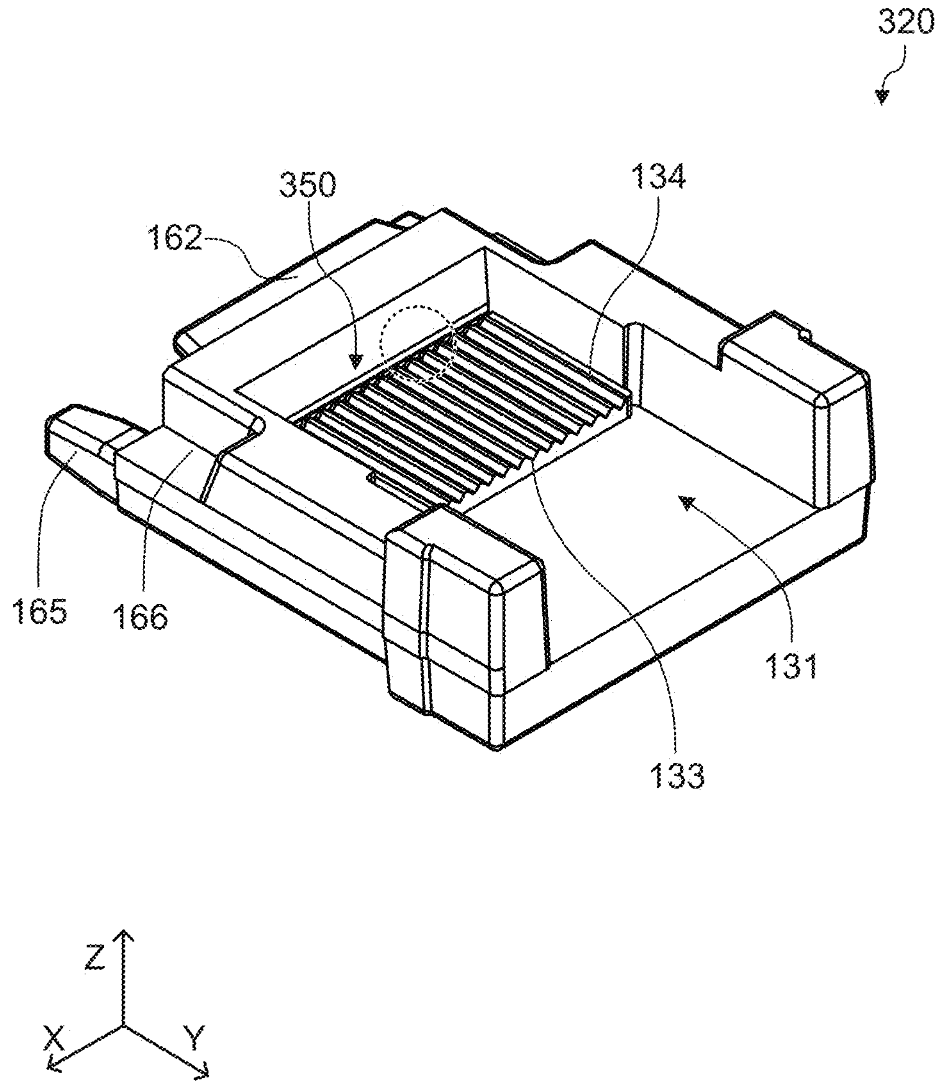
FIG. 13 is a perspective view of an optical connector according to Embodiment 3 with the lid thereof removed.
Figure 14:
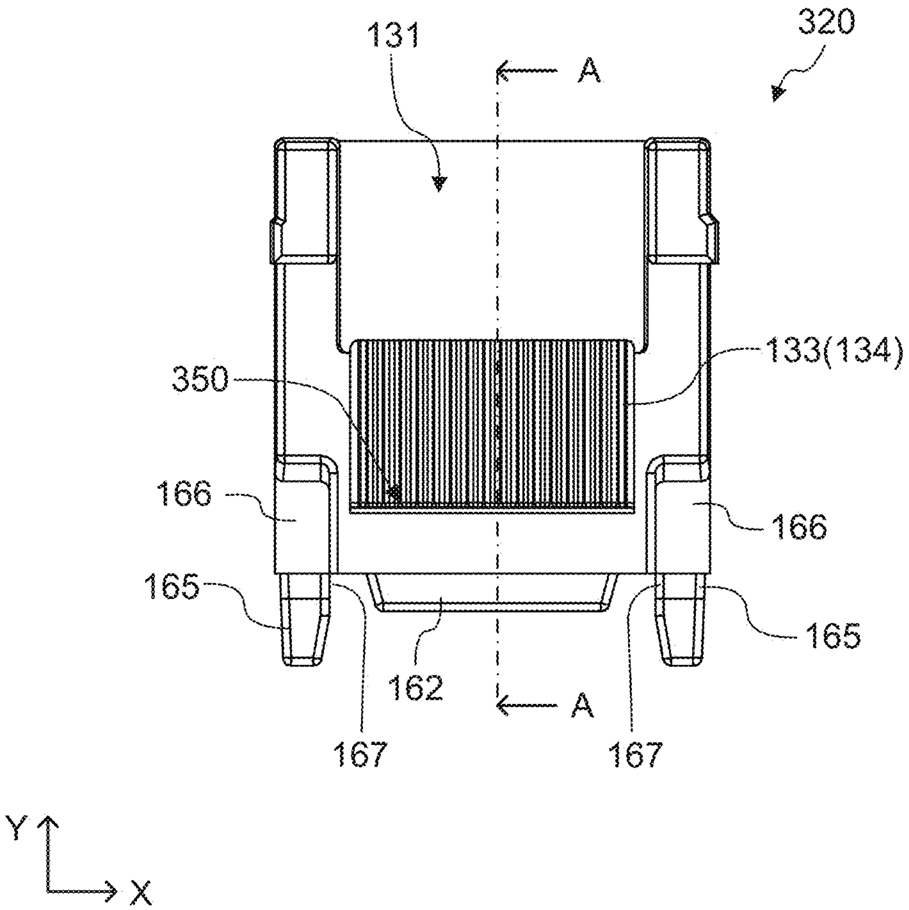
FIG. 14 is a plan view of the optical connector according to Embodiment 3 with the lid removed.
Figure 15A:
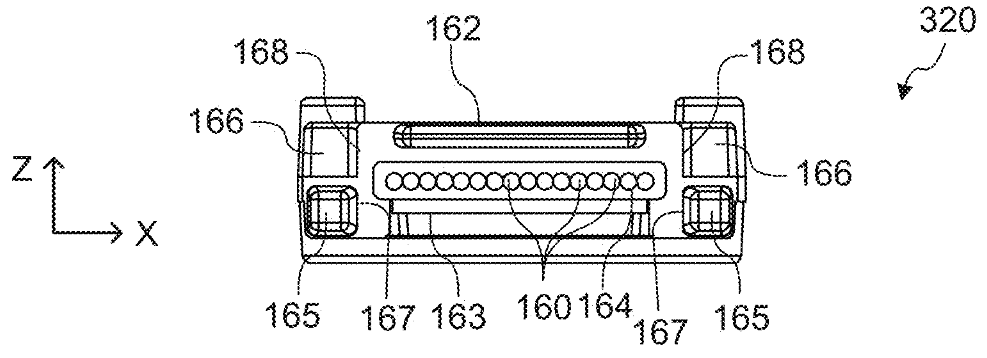
FIGS. 15A to 15D illustrate the configuration of the optical connector according to Embodiment 3 with the lid removed.
Figure 15B:
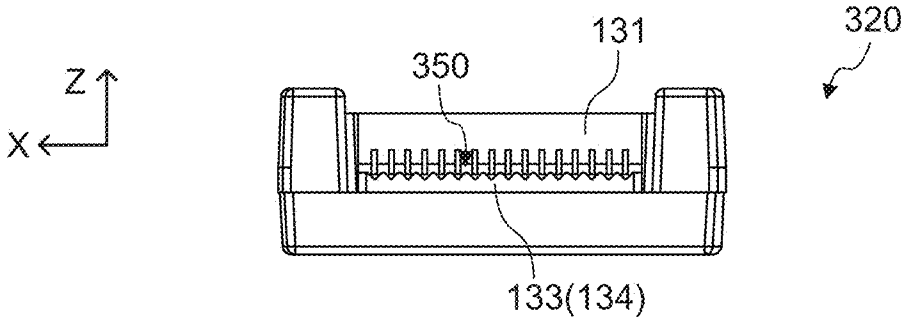
Figure 15C:
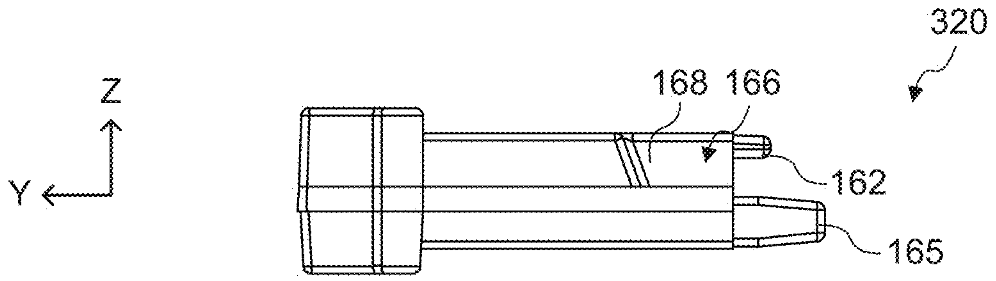
Figure 15D:
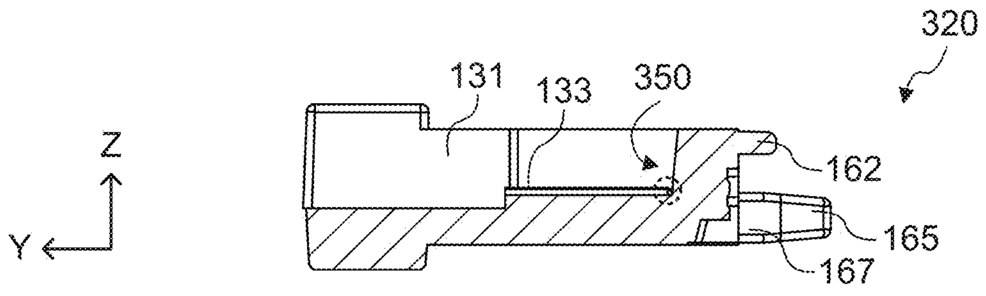
Figure 16:
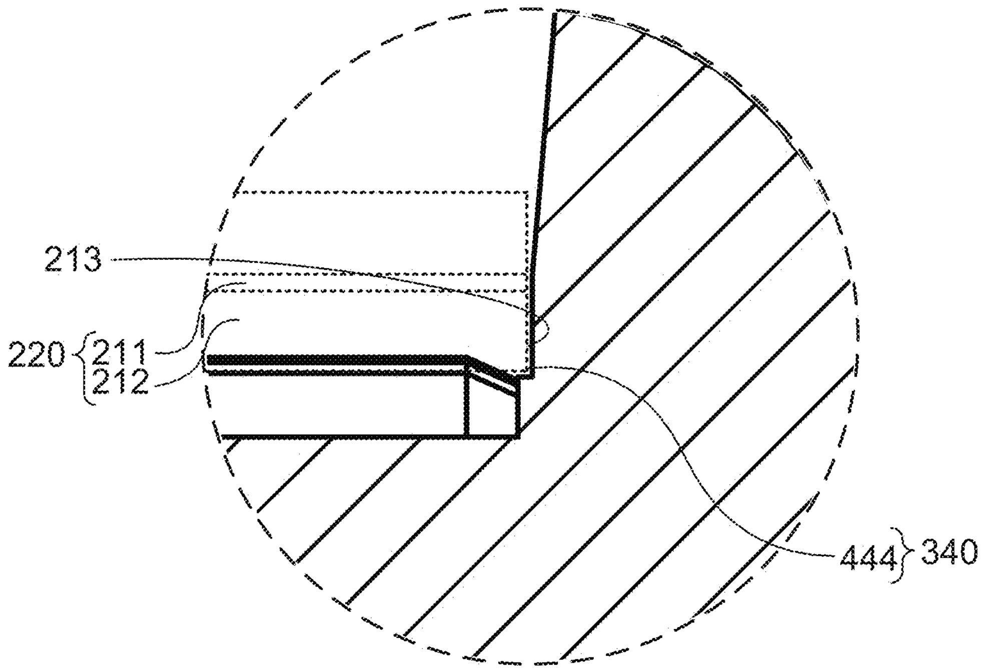
FIG. 16 is an enlarged view of the region indicated by the dashed line in FIG. 15D.

FIG. 13 is a perspective view of optical connector 320 according to Embodiment 3 with lid 132 removed. FIG. 14 is a plan view of optical connector 320 according to Embodiment 3 with lid 132 removed. FIG. 15A is a front view, FIG. 15B is a rear view, and FIG. 15C is a left side view each illustrating optical connector 320 according to Embodiment 3 with lid 132 removed, and FIG. 15D is a cross-sectional view taken along line A-A in FIG. 14. FIG. 16 is an enlarged view of the region indicated by the dashed line in FIG. 15D.

Optical connector module 300 according to the present embodiment includes optical transmission members 210 and optical connector 320. Optical transmission member 210 in the present embodiment is the same as optical transmission member 210 in Embodiment 2; therefore, the description thereof will be omitted.

Optical connector 320 includes holding part 130, positioning part 340, first optical part 350, and second optical parts 160. In the present embodiment, in addition to the above configuration, optical connector 320 further includes protrusion 162, recess 163, engaging protrusions 165, and engaging recesses 166. Holding part 130, second optical parts 160, protrusion 162, recess 163, engaging protrusions 165, and engaging recesses 166 in the present embodiment are the same as those in Embodiments 1 and 2; therefore, the descriptions of these components will be omitted.

Positioning part 340 in the present embodiment includes fourth positioning part 444. Fourth positioning part 444 contacts the lower portion of end surface 213 of optical transmission member 210 (optical fiber). In the present embodiment, fourth positioning part 444 contacts cladding 212 but does not contact core 211.

The inclination angle of a surface of fourth positioning part 444—the surface contacting end surface 213 of optical transmission member 210—is preferably the same as the inclination angle of end surface 213. In the present embodiment, the inclination angle of the surface of fourth positioning part 444 contacting end surface 213 of optical transmission member 210 is the same as that of end surface 213. In the present embodiment, the angle is 0°.

First optical part 350 is disposed at a position such that the first optical part does not contact end surface 213 when a portion of end surface 213 is in contact with fourth positioning part 444, also in the present embodiment. In the present embodiment, first optical part 350 is an elongated recess extending in the first direction (X direction).

First optical part 350 is connected to an inclined surface and fifth inner surface 355, in the YZ cross section. In the present embodiment, the inclination angle of the first optical part 350 is the same as the inclination angle of end surface 213 of optical transmission member 210. That is, first optical part 350 is disposed along the second direction (Z direction).

Third inner surface 355 is connected to first optical part 350 and fourth positioning part 444, in the YZ cross section. In the present embodiment, the inclination angle of third inner surface 355 is 90° with respect to the inclination angle of end surface 213 of optical transmission member 210 and to the inclination angle of the surface of fourth positioning part 444 contacting end surface 213 of optical transmission member 210.

(Method of Using Optical Connector Module)

In the following, a method of using optical connector module 300 will be described with reference to FIG. 17.

Figure 17:
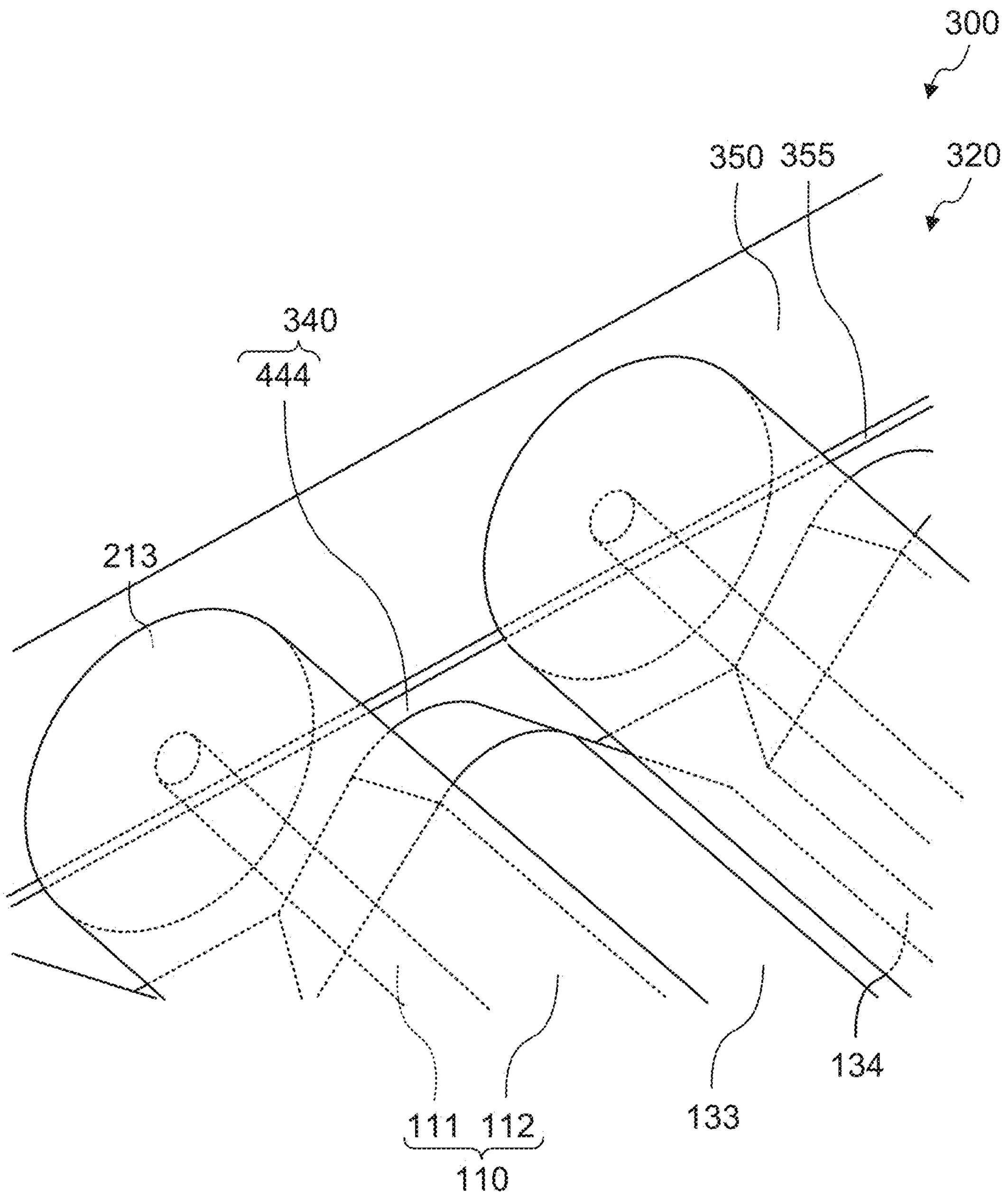
FIG. 17 schematically illustrates how optical transmission members are positioned with respect to the optical connector according to Embodiment 3.

FIG. 17 schematically illustrates how optical transmission members 210 are positioned with respect to optical connector 320 according to Embodiment 3.

As illustrated in FIG. 17, in the present embodiment, end surfaces 213 of optical transmission members 210 are brought to abut against positioning part 340 (fourth positioning part 444) of optical connector 320. As a result, cladding 212 of each optical transmission member 210 comes into contact with fourth positioning part 444. At this time, the space between first optical part 350 and end surface 213 communicates with the outside of the optical connector through the gap between optical connector 320 and end surface 213. More specifically, the space between first optical part 350 and end surface 213 communicates with the outside through the gap between optical connector 320 and the upper portion of end surface 213.

The spaces between first optical part 350 and end surfaces 213 are then filled with an optically transparent resin composition (adhesive). At this time, the filling is performed so that the optically transparent resin composition contacts first optical part 350 and end surfaces 213. In the present embodiment, the spaces between the first optical part 350 and the end surfaces 213 are filled with the optically transparent resin composition, and the optically transparent resin composition contacts the side surfaces of optical transmission members 210. Lid 132 is then disposed to cover holding recess 131 in such a way that optical transmission members 210 are pressed against grooves 134 of optical connector 320. Optical transmission members 210 are fixed to optical connector 320 by curing the optically transparent resin composition as the last step. The other processes are the same as those in the method of using optical connector module 100 in Embodiment 1.

Embodiment 4

(Configurations of Optical Connector Module and Optical Connector)

In the following, optical connector module 400 according to Embodiment 4 will be described.

Figure 18:
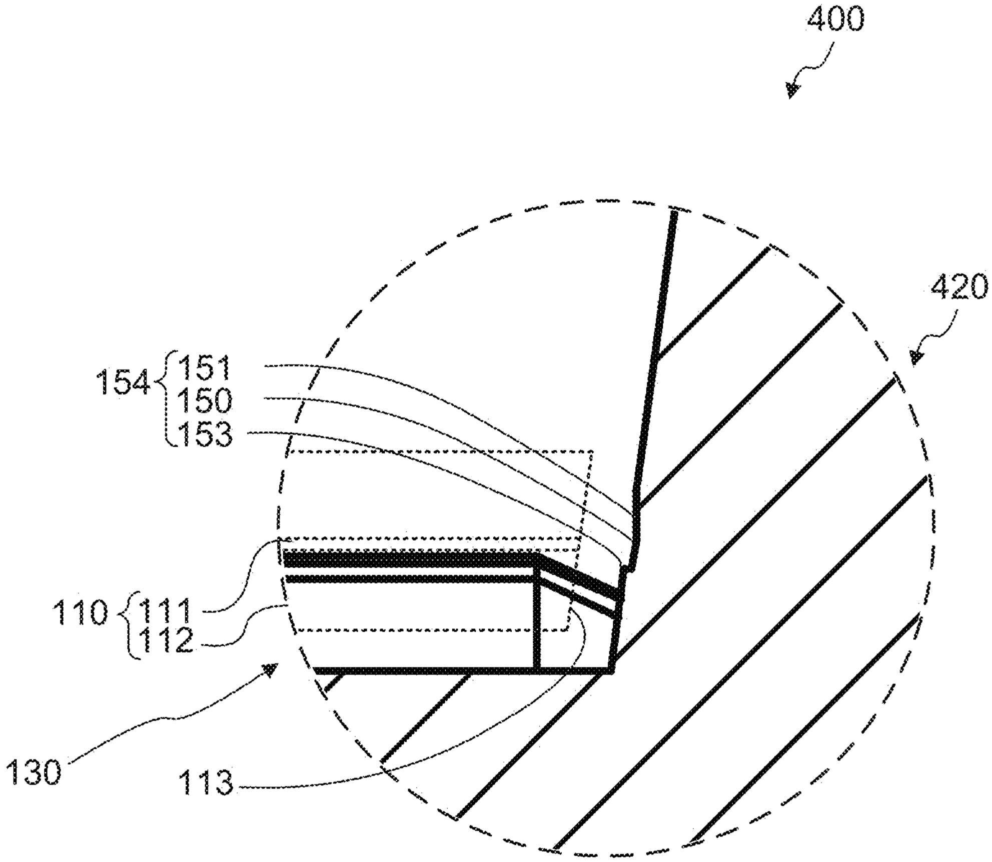
FIG. 18 is a partially enlarged cross-sectional view of the vicinity of a first optical part in an optical connector according to Embodiment 4.

FIG. 18 is a partially enlarged cross-sectional view of the vicinity of first optical part 150 in optical connector 420 according to Embodiment 4.

As illustrated in FIG. 18, optical connector module 400 according to the present embodiment includes optical transmission members 110 and optical connector 420. Optical transmission member 110 in the present embodiment is the same as that of Embodiment 1; therefore, the description thereof will be omitted.

Optical connector 420 in the present embodiment includes holding part 130, first optical part 150, and second optical parts 160. That is, optical connector 420 in the present embodiment does not include positioning part 140. In this case, end surface 113 of optical transmission member 110 does not contact any part. In the present embodiment, optical transmission member 110 is separated from first optical part 150. The space between first optical part 150 and end surface 113 communicates with the outside of the optical connector through the gap between optical connector 420 and end surface 113.

(Method of Using Optical Connector Module)

In the following, a method of using optical connector module 400 will be described.

As illustrated in FIG. 18, in the present embodiment, optical transmission members 110 are disposed with respect to holding part 130 of optical connector 420. At this time, end surface 113 of optical transmission member 110 is not in contact with any part. At this time, the space between first optical part 150 and end surface 113 communicates with the outside of the optical connector through the gap between optical connector 420 and end surface 113. More specifically, the space between first optical part 150 and end surface 113 communicates with the outside through gaps between optical connector 420 and the both side portions of end surface 113.

The spaces between first optical part 150 and end surfaces 113 are then filled with an optically transparent resin composition (adhesive). At this time, the filling is performed so that the optically transparent resin composition contacts first optical part 150 and end surfaces 113. In the present embodiment, the spaces between first optical part 150 and end surfaces 113 are filled with the optically transparent resin composition. Lid 132 is then disposed to cover holding recess 131 in such a way that optical transmission members 110 are pressed against grooves 134 of optical connector 420. Optical transmission members 110 are fixed to optical connector 420 by curing the optically transparent resin composition (adhesive) as the last step.

(Effect) Optical connector module 400 of the present embodiment has the same effects as optical connector module 100 of Embodiment 1.

This application is entitled to and claims the benefit of Japanese Patent Application No. 2021-194718 filed on Nov. 30, 2021, the disclosure of which including the specification and drawings is incorporated herein by reference in its entirety.

INDUSTRIAL APPLICABILITY

The optical connectors and optical connector modules according to the present invention are particularly advantageous for optical communications using optical transmission members.

REFERENCE SIGNS LIST

100, 200, 300, 400 Optical connector module
110, 210 Optical transmission member
111, 211 Core
112, 212 Cladding
113, 213 End surface
120, 220, 320, 420 Optical connector
130 Holding part
131 Holding recess
132 Lid
133 Elongated protrusion
134 Groove
140, 240, 340 Positioning part
150, 250, 350 First optical part
151 First inner surface
153 Second inner surface
154 Elongated recess
160 Second optical part
162 Protrusion
163 Recess
165 Engaging protrusion
166 Engaging recess
167 Inward restricting surface
168 Outward restricting surface
355 Third inner surface

The invention claimed is:

1. An optical connector for optically coupling optical transmission members to each other, the optical connector comprising:

- a holding part for holding an end portion of an optical transmission member that is one of the optical transmission members;
- a positioning part configured to position an end surface of the optical transmission member by contacting a lower portion and an upper portion of the end surface of the optical transmission member, without contacting a core of the optical transmission member;

a first optical part for allowing light from the end surface of the optical transmission member to enter an inside of the optical connector, or for emitting light traveling through the inside of the optical connector toward the end surface; and a second optical part for allowing light from another optical connector holding another optical transmission member of the optical transmission members to enter the inside of the optical connector, or for emitting light traveling through the inside of the optical connector toward the other optical connector, wherein the first optical part is disposed at a position such that the first optical part does not contact the end surface when the lower portion and the upper portion of the end surface are in contact with the positioning part, and wherein when the lower portion and the upper portion of the end surface are brought Into contact with the positioning part, a space between the first optical part and the end surface communicates with an outside of the optical connector through gaps between the optical connector and both side portions of the end surface.

2. The optical connector according to claim 1, wherein the first optical part includes a curved surface portion.

3. The optical connector according to claim 1, wherein an intersection of an optical axis of light emitted from the optical transmission member and the first optical part is on a curved surface.

4. The optical connector according to claim 1, wherein the holding part includes a plurality of grooves formed on an inner surface of a recess of the holding part.

5. An optical connector module, comprising:

an optical transmission member; and the optical connector according to claim 1, wherein the space between the first optical part and the end surface is filled with a cured product of an optically transparent resin composition.

6. An optical connector module, comprising:

an optical transmission member; and the optical connector according to claim 4, wherein:

the optical connector module further includes a lid disposed opposite the holding part across the optical transmission member, the lid being disposed in the recess, and a distance between the lid and the first optical part is within a range of 0.05 to 0.4 mm.

* * * * *